US012299399B2

United States Patent
Du et al.

(10) Patent No.: US 12,299,399 B2
(45) Date of Patent: May 13, 2025

(54) METHOD, APPARATUS, AND SYSTEM FOR RECOGNIZING TEXT IN IMAGE

(71) Applicant: Huawei Technologies Co., Ltd., Guangdong (CN)

(72) Inventors: Lin Du, Beijing (CN); Alfred Chixiong Shen, Shenzhen (CN); Lemeng Pan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 347 days.

(21) Appl. No.: 17/740,718

(22) Filed: May 10, 2022

(65) Prior Publication Data
US 2022/0262151 A1 Aug. 18, 2022

Related U.S. Application Data

(63) Continuation of application No. PCT/CN2020/133807, filed on Dec. 4, 2020.

(30) Foreign Application Priority Data

Dec. 30, 2019 (CN) .......................... 201911391341.5

(51) Int. Cl.
*G06F 40/30* (2020.01)
*G06F 40/295* (2020.01)
(Continued)

(52) U.S. Cl.
CPC ............ *G06F 40/30* (2020.01); *G06F 40/295* (2020.01); *G06V 10/774* (2022.01);
(Continued)

(58) Field of Classification Search
CPC . G06F 40/30; G06F 40/279; G06V 30/18057; G06V 30/413; G06V 10/778
(Continued)

(56) References Cited

U.S. PATENT DOCUMENTS

2007/0206884 A1* 9/2007 Kato .................... G06V 30/262
382/229
2010/0215261 A1 8/2010 Kim et al.
(Continued)

FOREIGN PATENT DOCUMENTS

CN 108228686 A 6/2018
CN 108536679 A 9/2018
(Continued)

OTHER PUBLICATIONS

Text Detection Based on Convolution Neural Networks With Spatial Pyramid Pooling, Rui Zhu, Xiao-Jiao Mao, Qi-Hai Zhu, Ning Li, Yu-Bin Yang; IEEE Aug. 3, 2016 pp. 1032-1036 (Year: 2016).*
(Continued)

*Primary Examiner* — Jamares Q Washington
(74) *Attorney, Agent, or Firm* — WOMBLE BOND DICKINSON (US) LLP

(57) ABSTRACT

A method for recognizing a text in an image includes: obtaining a plurality of recognition results of a to-be-recognized text in an image according to a plurality of recognition methods (S201); obtaining semantic information of the recognition results (S202); obtaining feature information of the image, where the feature information of the image can represent information around the to-be-recognized text in the image (S203); and determining a target recognition result of the to-be-recognized text from the plurality of recognition results based on the feature information of the image and the semantic information of the plurality of recognition results (S204). According to the method, accuracy of determining the most accurate recognition result from the plurality of recognition results can be improved, that is, a precise recognition result can be obtained.

20 Claims, 12 Drawing Sheets

(51) Int. Cl.
  *G06V 10/774* (2022.01)
  *G06V 10/778* (2022.01)
  *G06V 10/80* (2022.01)
  *G06V 10/82* (2022.01)
  *G06V 30/14* (2022.01)
  *G06V 30/18* (2022.01)
  *G06V 30/262* (2022.01)
  *G06V 30/412* (2022.01)
  *G06V 30/416* (2022.01)
(52) U.S. Cl.
  CPC .......... *G06V 10/778* (2022.01); *G06V 10/806* (2022.01); *G06V 10/82* (2022.01); *G06V 30/1444* (2022.01); *G06V 30/18057* (2022.01); *G06V 30/274* (2022.01); *G06V 30/412* (2022.01); *G06V 30/416* (2022.01)
(58) Field of Classification Search
  USPC ........ 382/103, 156, 159, 161, 176, 177, 229
  See application file for complete search history.

(56) References Cited

U.S. PATENT DOCUMENTS

2019/0220746 A1* 7/2019 Liu .................. G06N 3/084
2021/0081729 A1 3/2021 Huang et al.

FOREIGN PATENT DOCUMENTS

| CN | 109344836 A | 2/2019 |
| CN | 110390324 A | 10/2019 |
| CN | 110569846 A | 12/2019 |
| CN | 110619325 A | 12/2019 |
| EP | 3570208 A1 | 11/2019 |
| KR | 20110109345 A | 10/2011 |

OTHER PUBLICATIONS

Manuel Carbonell et al, TreyNet: A Neural Model for Text Localization, Transcription and Named Entity Recognition in Full Pages, arXiv:1912.10016v1 [cs.CV] Dec. 20, 2019, 8 pages, XP081563513.

* cited by examiner

METHOD, APPARATUS, AND SYSTEM FOR RECOGNIZING TEXT IN IMAGE

CROSS-REFERENCE TO RELATED APPLICATIONS

This application is a continuation of International Application No. PCT/CN2020/133807, filed on Dec. 4, 2020, which claims priority to Chinese Patent Application No. 201911391341.5, filed on Dec. 30, 2019. The disclosures of the aforementioned applications are hereby incorporated by reference in their entireties.

TECHNICAL FIELD

This application relates to computer technologies, and in particular, to a method, an apparatus, and a system for recognizing a text in an image.

BACKGROUND

Optical character recognition (OCR) is a technology for converting texts on various bills, newspapers, books, manuscripts, and other printed materials into images through optical input such as scanning, and then recognizing the texts in the images by using a text recognition technology, to convert the texts on the printed materials into computer editable texts, that is, a technology for recognizing a text in an image. The technology can be used in the fields of entry and processing of bank bills, a large quantity of text materials, archives and volumes, and copywriting.

Currently, there are a plurality of methods for recognizing a text in an image, for example, a method in which after a recognition result is obtained, error correction is performed on the recognition result by using a natural language processing (NLP) error correction algorithm, to obtain a final recognition result. However, currently, in the method for recognizing a text in an image, a precise text recognition result cannot be obtained.

SUMMARY

Embodiments of this application provide a method, an apparatus, and a system for recognizing a text in an image, to obtain a precise text recognition result.

According to a first aspect, embodiments of this application provides a method for recognizing a text in an image, including: obtaining a plurality of recognition results of a to-be-recognized text in an image according to a plurality of recognition methods; obtaining semantic information of the recognition results; obtaining feature information of the image, where the feature information of the image can represent information around the to-be-recognized text in the image; and determining a target recognition result of the to-be-recognized text from the plurality of recognition results based on the feature information of the image and the semantic information of the plurality of recognition results. The target recognition result is a recognition result whose accuracy is higher than that of another recognition result in the plurality of recognition results.

In this solution, after the plurality of recognition results are obtained by using the plurality of methods, the recognition result whose accuracy is higher than that of the another recognition result is determined from the plurality of recognition results based on the semantic information of the recognition results and the feature information that is of the image and that can represent the information around the to-be-recognized text in the image (for convenience of subsequent description, in this embodiment, the recognition result that is in the plurality of recognition results and whose accuracy is higher than that of the another recognition result is referred to as a most accurate recognition result), and the determined most accurate recognition result is used as the recognition result of the text in the image. A recognition result in the recognition results that includes the feature information of the image can be recognized because the feature information that is of the image and that can represent the information around the to-be-recognized text in the image is combined when the most accurate recognition result is determined from the plurality of recognition results. Therefore, accuracy of determining the most accurate recognition result from the plurality of recognition results can be improved, that is, a precise text recognition result can be obtained.

In one embodiment, the semantic information of the recognition result includes named entity information in the recognition result and semantic association information between words included in the recognition result.

The semantic information in this solution includes the named entity information in the recognition result, so that the semantic information that is in the recognition result and that is obtained in this solution is precise.

In one embodiment, the obtaining feature information of the image includes: obtaining layout feature information that is in the image and that is of content included in the image; obtaining location feature information of the to-be-recognized text in the image; and obtaining the feature information of the image based on the layout feature information and the location feature information of the to-be-recognized text in the image.

This solution provides embodiments of obtaining the feature information of the image. The feature information that is of the image and that is obtained in this solution can represent the information around the to-be-recognized text in the image, and can further assist in determining the most accurate recognition result from the recognition results based on the semantic information of the recognition results.

In one embodiment, the obtaining the feature information of the image based on the layout feature information and the location feature information of the to-be-recognized text in the image includes: fusing the layout feature information and the location feature information of the to-be-recognized text in the image to obtain preliminary feature information of the image; performing pooling processing on the preliminary feature information of the image to obtain preselected feature information of the image; and combining the preselected feature information of the image and the location feature information of the to-be-recognized text in the image to obtain the feature information of the image.

This solution provides embodiments of obtaining the feature information of the image based on the layout feature information and the location feature information of the to-be-recognized text in the image.

In one embodiment, the determining a target recognition result from the plurality of recognition results based on the feature information of the image and the semantic information of the plurality of recognition results includes: using the feature information of the image and the semantic information of the recognition results as an input of an attention mechanism-based neural network model, and outputting a target label by using an attention mechanism-based neural network algorithm, where the target label indicates a probability that each recognition result is the target recognition result; and determining the target recognition result of the to-be-recognized text from the plurality of recognition results based on a similarity between the target label and each preset label, where each preset label corresponds to a recognition result obtained by using a recognition method.

This solution provides embodiments of determining the target recognition result from the plurality of recognition results based on the feature information of the image and the semantic information of the plurality of recognition results. In this solution, accuracy of determining the most accurate recognition result from the recognition results can be improved.

In one embodiment, the semantic information of the recognition result is obtained based on a first machine learning model; and before the obtaining semantic information of the recognition results, the method further includes: obtaining a plurality of first training samples and a label of each first training text, where the label of the first training text is used to indicate named entity information corresponding to the first training sample; and training the first machine learning model based on the plurality of first training samples, labels of the plurality of first training samples, a plurality of second training samples obtained after partial information of each of the plurality of first training samples is masked, and the masked information. In one embodiment, loss functions used to train the first machine learning model include a first loss function and a second loss function; and the first loss function is a loss function related to predicting the named entity information of the first training sample, and the second loss function is a loss function related to predicting the masked information.

In this solution, a method for training the first machine learning model can enable the obtained first machine learning model to have a capability of obtaining the named entity information in the recognition result and the semantic association information between the words included in the recognition result.

In one embodiment, the layout feature information that is in the image and that is of the content included in the image is obtained based on a second machine learning model, and a neural network corresponding to the second machine learning model includes at least one of the following subnetworks: a convolutional subnetwork, a dilated convolutional subnetwork, and a deformable convolutional subnetwork.

In this solution, accuracy of the obtained layout feature information that is in the image and that is of the content included in the image can be improved, and accuracy of determining the most accurate recognition result from the recognition results can be further improved.

In one embodiment, the location feature information of the to-be-recognized text in the image is obtained based on a third machine learning model, and a neural network corresponding to the third machine learning model includes a convolutional subnetwork. In one embodiment, the neural network corresponding to the third machine learning model further includes a spatial pyramid pooling subnetwork.

In this solution, the convolutional subnetwork is used, so that accurate location feature information of the to-be-recognized text in the image can be obtained. When the neural network corresponding to the third machine learning model includes the spatial pyramid pooling subnetwork, the layout feature information that is in the image and that is of the content included in the image and the location feature information of the to-be-recognized text in the image can be further normally fused.

According to a second aspect, embodiments of this application provides an electronic device, including at least one processor and a memory communicatively connected to the at least one processor. The memory stores instructions that can be executed by the at least one processor, and when the instructions are executed by the at least one processor, the at least one processor can perform the method according to any one of the first aspect or the possible implementations of the first aspect.

According to a third aspect, embodiments of this application provides a system for recognizing a text in an image, including a first device and a second device.

The first device is configured to send at least one machine learning model to the second device.

The second device is configured to:
- obtain a plurality of recognition results of a to-be-recognized text in an image according to a plurality of recognition methods; and
- based on a plurality of machine learning models, obtain semantic information of the recognition results, and obtain feature information of the image; and determine a target recognition result from the plurality of recognition results based on the feature information and the semantic information, where the feature information of the image can represent information around the to-be-recognized text in the image, and the plurality of machine learning models include the at least one machine learning model.

In one embodiment, the plurality of machine learning models include a first machine learning model. The second device is specifically configured to obtain the semantic information of the recognition results based on the first machine learning model, where the semantic information of the recognition result includes named entity information in the recognition result and semantic association information between words included in the recognition result.

In one embodiment, the plurality of machine learning models include a second machine learning model and a third machine learning model. The second device is specifically configured to: obtain, based on the second machine learning model, layout feature information that is in the image and that is of content included in the image; obtain location feature information of the to-be-recognized text in the image based on the third machine learning model; and obtain the feature information of the image based on the layout feature information and the location feature information of the to-be-recognized text in the image.

In one embodiment, when the second device is configured to obtain the feature information of the image based on the layout feature information and the location feature information of the to-be-recognized text in the image, the second device is specifically configured to: fuse the layout feature information and the location feature information of the to-be-recognized text in the image to obtain preliminary feature information of the image; perform pooling processing on the preliminary feature information of the image to obtain preselected feature information of the image; and combine the preselected feature information of the image and the location feature information of the to-be-recognized text in the image to obtain the feature information of the image.

In one embodiment, the plurality of machine learning models further include an attention mechanism-based neural network model. The second device is specifically configured to: use the feature information of the image and the semantic information of the recognition results as an input of the attention mechanism-based neural network model, and output a target label by using an attention mechanism-based neural network algorithm, where the target label indicates a probability that each recognition result is the target recognition result; and determine the target recognition result of the to-be-recognized text from the plurality of recognition results based on a similarity between the target label and each preset label, where each preset label corresponds to a recognition result obtained by using a recognition method.

In one embodiment, the at least one machine learning model includes the first machine learning model. Before the first device sends the first machine learning model to the second device, the first device is further configured to: obtain a plurality of first training samples and a label of each first training text, where the label of the first training text is used to indicate named entity information corresponding to the first training sample; and train the first machine learning model based on the plurality of first training samples, labels of the plurality of first training samples, a plurality of second training samples obtained after partial information of each of the plurality of first training samples is masked, and the masked information.

In one embodiment, the at least one machine learning model does not include the first machine learning model. Before the second device obtains the semantic information of the recognition results, the second device is further configured to: obtain a plurality of first training samples and a label of each first training text, where the label of the first training text is used to indicate named entity information corresponding to the first training sample; and train the first machine learning model based on the plurality of first training samples, labels of the plurality of first training samples, a plurality of second training samples obtained after partial information of each of the plurality of first training samples is masked, and the masked information.

In one embodiment, loss functions used when the first device trains the first machine learning model include a first loss function and a second loss function; and the first loss function is a loss function related to predicting the named entity information of the first training sample, and the second loss function is a loss function related to predicting the masked information.

In one embodiment, a neural network corresponding to the second machine learning model includes at least one of the following subnetworks: a convolutional subnetwork, a dilated convolutional subnetwork, and a deformable convolutional subnetwork.

In one embodiment, a neural network corresponding to the third machine learning model includes a convolutional subnetwork.

In one embodiment, the neural network corresponding to the third machine learning model further includes a spatial pyramid pooling subnetwork.

In one embodiment, the first device is a local server or a cloud server, and the second device is a terminal device. Alternatively, the first device is a local server, and the second device is a cloud server.

According to a fourth aspect, embodiments of this application provides a non-transitory computer-readable storage medium storing computer instructions. The computer instructions are used to enable a computer to perform the method according to any one of the first aspect or the possible implementations of the first aspect.

In this application, after the plurality of recognition results are obtained by using the plurality of methods, the most accurate recognition result is determined from the plurality of recognition results based on the semantic information of the recognition results and the feature information that is of the image and that can represent the information around the to-be-recognized text in the image, and the determined most accurate recognition result is used as the recognition result of the text in the image. A recognition result in the recognition results that includes the feature information of the image can be recognized because the feature information that is of the image and that can represent the information around the to-be-recognized text in the image is combined when the most accurate recognition result is determined from the plurality of recognition results. Therefore, accuracy of determining the most accurate recognition result from the plurality of recognition results can be improved, that is, a precise text recognition result can be obtained.

DESCRIPTION OF EMBODIMENTS

Elements in this application are first described.

1. Named entity (NE): The named entity is a person name, an organization name, a place name, or all other entities identified by names. More broadly named entities further include a number, a date, a currency, an address, and the like.

2. Machine learning result: In the field of machine learning, a commonly used technology is that a machine learning model is obtained by training a large quantity of training samples, and then a to-be-learned object is learned by using the machine learning model, to obtain a machine learning result. The machine learning result may be, for example, a category of the to-be-learned object, a speech recognition result of the to-be-learned object, a translation result of the to-be-learned object, a face recognition result of the to-be-learned object, semantic information of the to-be-learned object, or image feature information of the to-be-learned object. When the machine learning model is used, In one embodiment, a server may obtain the to-be-learned object from a terminal device, and learn the to-be-learned object based on the machine learning model, to obtain the machine learning result. In one embodiment, the server may send the machine learning result to the terminal device to display the machine learning result to a user. The machine learning model may be obtained by the server through training, or may be received from another server (for example, a local server obtains the machine learning model from s cloud server). In another manner, a server sends the machine learning model to a terminal device, so that the terminal device learns the to-be-learned object based on the machine learning model, to obtain the machine learning result. The server may be a cloud server or a local server.

The machine learning model in this embodiment includes a machine learning network and a parameter of the machine learning network. For example, when the machine learning network is a neural network, a parameter of the neural network may include a connection weight and/or a filter between neurons at each adjacent layer.

Figure 1:
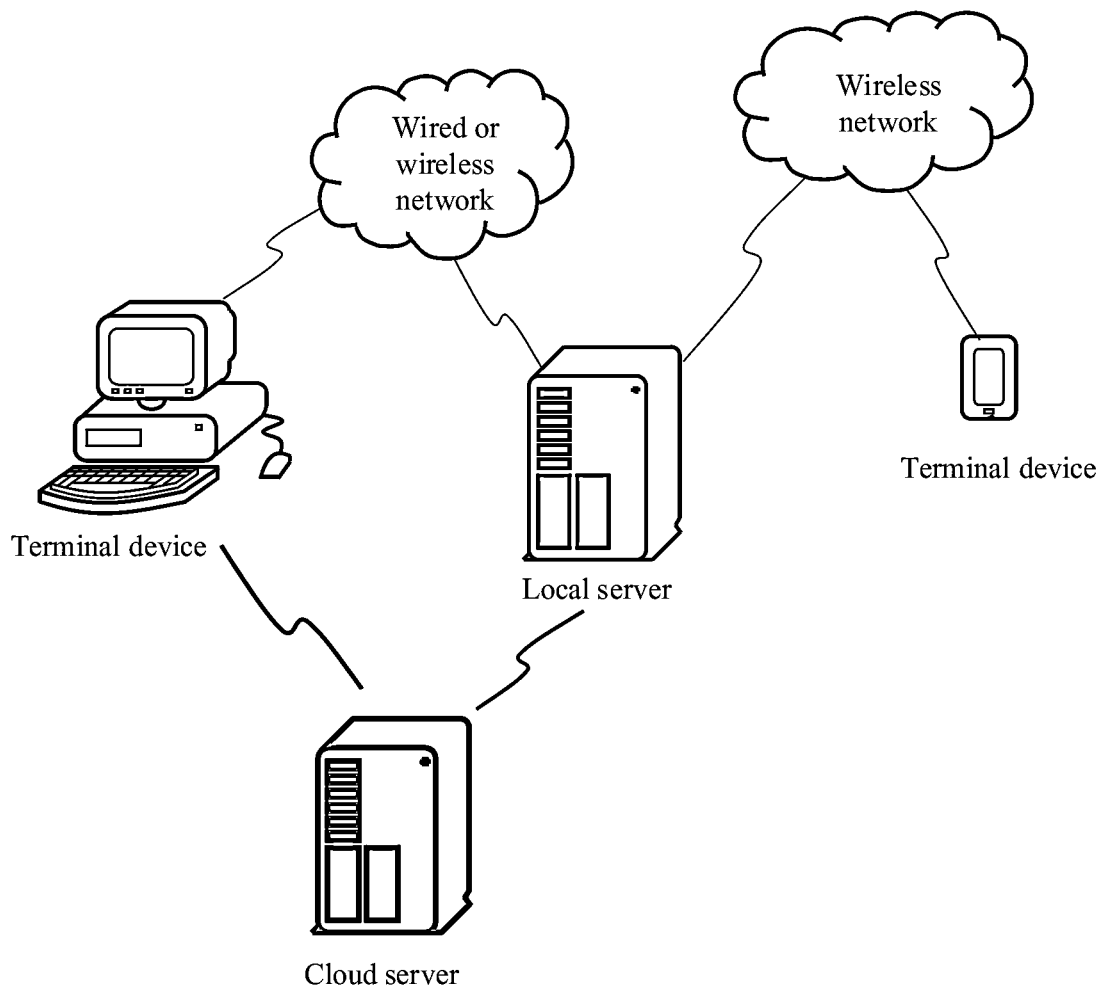
FIG. 1 is a diagram of a system architecture according to an embodiment of this application.

A system architecture in the foregoing machine learning process is shown in FIG. 1. Refer to FIG. 1. The system architecture includes a server and a terminal device. The server may include a local server and a cloud server.

The following describes, by using specific embodiments, a method for recognizing a text in an image in this application.

Figure 2:
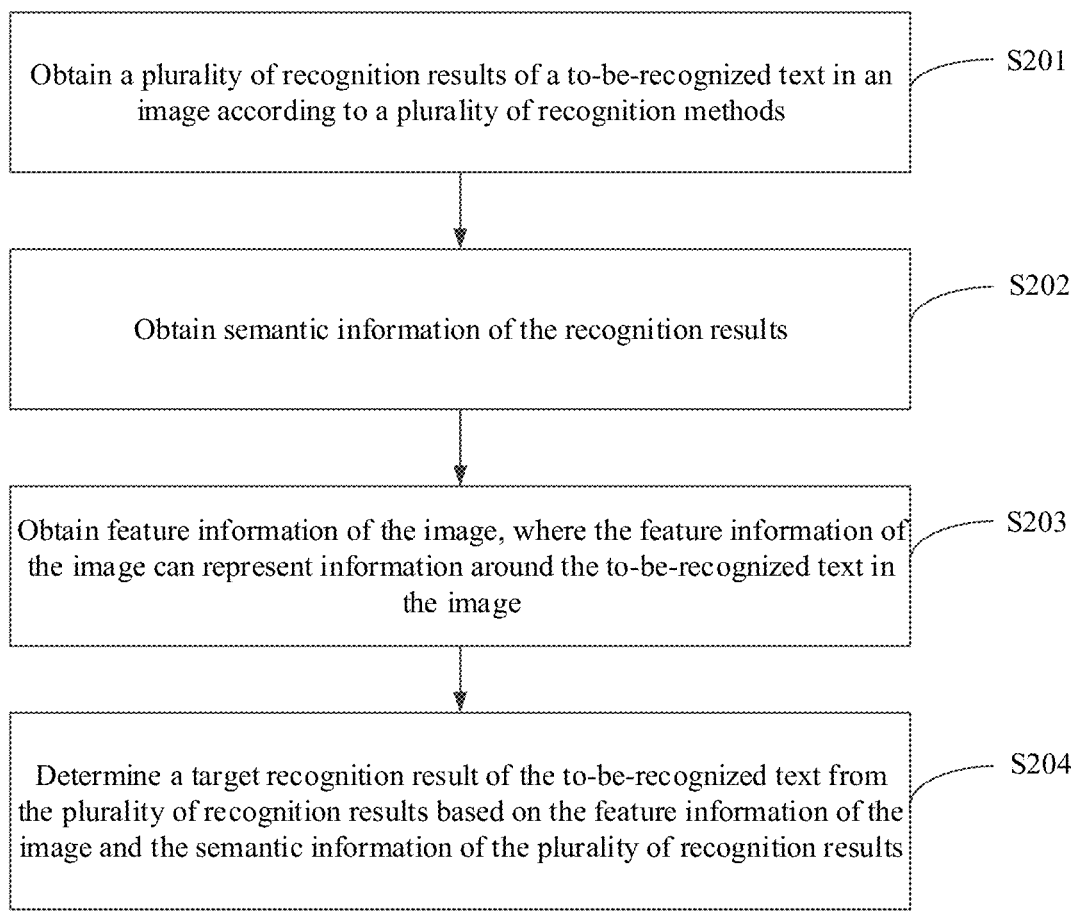
FIG. 2 is a flowchart of a method for recognizing a text in an image according to an embodiment of this application.

FIG. 2 is a flowchart of a method for recognizing a text in an image according to an embodiment of this application. This embodiment may be performed by a server or a terminal device, and the server may be a cloud server or a local server. Refer to FIG. 2. The method in this embodiment includes the following operations.

Operation S201: Obtain a plurality of recognition results of a to-be-recognized text in an image according to a plurality of recognition methods.

To be specific, the to-be-recognized text in the image is recognized by using the plurality of recognition methods, and the plurality of recognition results of the to-be-recognized text in the image are obtained. The plurality of recognition methods may include but are not limited to at least two of the following: a single character-based recognition method, a deep learning-based recognition method, a template matching-based recognition method, and a row-based recognition method.

Different recognition methods have different accuracy of recognizing the text in the image in different scenarios. Therefore, to obtain a precise recognition result of the to-be-recognized text in the image, the plurality of recognition results may be first obtained by using the plurality of recognition methods, and then the most accurate recognition result is determined from the plurality of recognition results, to improve accuracy of recognizing the text in the image.

Figure 4:
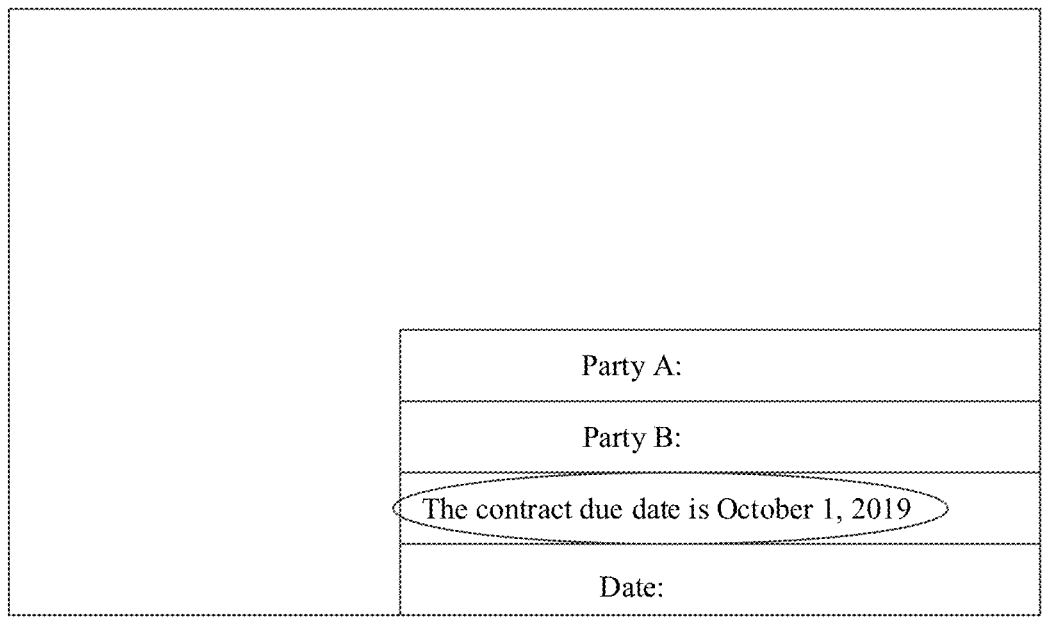
FIG. 4 is a schematic diagram of a process of obtaining an encoding sequence of each recognition result according to an embodiment of this application.

For example, the image is shown in FIG. 4. The to-be-recognized text in the image is a text "The contract due date is Oct. 1, 2019" circled in FIG. 4, and the to-be-recognized text in the image is recognized respectively by using a recognition method 1, a recognition method 2, and a recognition method 3. In this case, a recognition result 1 obtained by using the recognition method 1 may be: The contract due date is Oct. 1, 2019, a recognition result 2 obtained by using the recognition method 2 may be: |The contract due date is Oct. 1, 2019, and a recognition result 3 obtained by using the recognition method 3 may be: The contract due date is Oct. 1, 2019.

Operation S202: Obtain semantic information of the recognition results.

In one embodiment, the semantic information of the recognition results may be obtained by using methods described in a1 and a2.

a1. Perform word embedding on each recognition result to obtain an encoding sequence of each recognition result, where the encoding sequence includes a plurality of vectors.

Embodiments of performing word embedding on the recognition result to obtain the encoding sequence of the recognition result may include a11 to a13.

a11. Perform word segmentation on the recognition result.

A word segmentation method may include a currently commonly used word segmentation method.

a12. Obtain a word vector corresponding to each word included in the recognition result.

In one embodiment, each of all words obtained after word segmentation is performed on the recognition result may be converted into a digital vector through one-hot encoding, to obtain the digital vector corresponding to each word; and the digital vector corresponding to each word is multiplied by a pre-trained word vector matrix, to obtain a word vector corresponding to each word. The pre-trained word vector matrix includes word vectors corresponding to V words, elements in each row form a word vector of one word, and V is a size of a dictionary.

a13. Obtain the encoding sequence of the recognition result based on the word vector of each word included in the recognition result and a fourth machine learning model.

The fourth machine learning model may be a bidirectional neural network model. In this case, the word vector of each word included in the recognition result may be used as an input of the bidirectional neural network model, and semantic information of each word in the recognition result is learned based on an algorithm corresponding to the bidirectional neural network model, to obtain the encoding sequence of the recognition result, where the encoding sequence of the recognition result includes the word vector that is of each word and that includes the semantic information. A bidirectional neural network corresponding to the bidirectional neural network model may be a bidirectional-long short term memory (Bi-LSTM) neural network.

When this embodiment is performed by the terminal device, the method in this embodiment further includes: The terminal device receives the fourth machine learning model from the server. When this embodiment is performed by the local server, the method in this embodiment further includes: The local server obtains the fourth machine learning model through training, or the local server receives the fourth machine learning model from the cloud server. When this embodiment is performed by the cloud server, the method in this embodiment further includes: The cloud server obtains the fourth machine learning model through training, or the cloud server receives the fourth machine learning model from another server.

It may be understood that, operations a11 to a13 are embodiments of performing word embedding on the recognition result to obtain the encoding sequence of the recognition result. Embodiments in another manner may be further included. This is not limited in this embodiment.

In one embodiment, before word embedding is performed on each recognition result to obtain the encoding sequence of each recognition result, the method may further include the following operations: recognizing a language of each recognition result, for example, Chinese or English; and correspondingly, performing embedding encoding on each recognition result in a word embedding manner corresponding to the language to obtain the encoding sequence of each recognition result, where the language of each recognition result may be recognized by using a Naive Bayes model with N-gram.

In one embodiment, before word embedding is performed on each recognition result to obtain the encoding sequence of each recognition result, the method may further include the following operation: filtering out an abnormal character in each recognition result. For example, a language of the recognition result is Chinese. If the recognition result includes a Greek character, the Greek character is an abnormal character.

Figure 3:
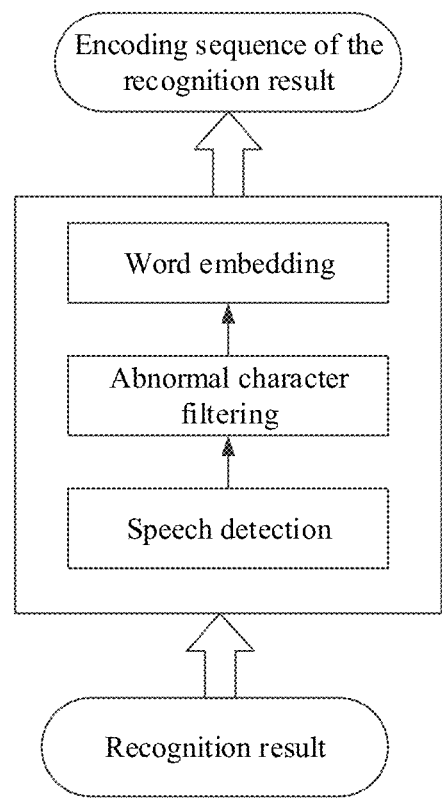
FIG. 3 is a schematic diagram of an image including a to-be-recognized text according to an embodiment of this application.

In conclusion, a schematic diagram of a process of performing word embedding on each recognition result to obtain the encoding sequence of each recognition result may be shown in FIG. 3: Language detection, abnormal character filtering, and word embedding are sequentially performed on each recognition result.

a2. Obtain the semantic information of each recognition result based on the encoding sequence of each recognition result and a first machine learning model.

For each recognition result, the encoding sequence of the recognition result is used as an input of the first machine learning model, and a first vector sequence is output based on an algorithm corresponding to the first machine learning model, where the first vector sequence includes a plurality of vectors, and is used to represent the semantic information of the recognition result. The semantic information of each recognition result may include named entity information in the recognition result and semantic association information between words included in the recognition result. The named entity information includes at least a location of a named entity in the recognition result (for example, the third word in the recognition result is the named entity), and may further include other information such as a category of the named entity (for example, a person name or a place name).

Figure 5A:
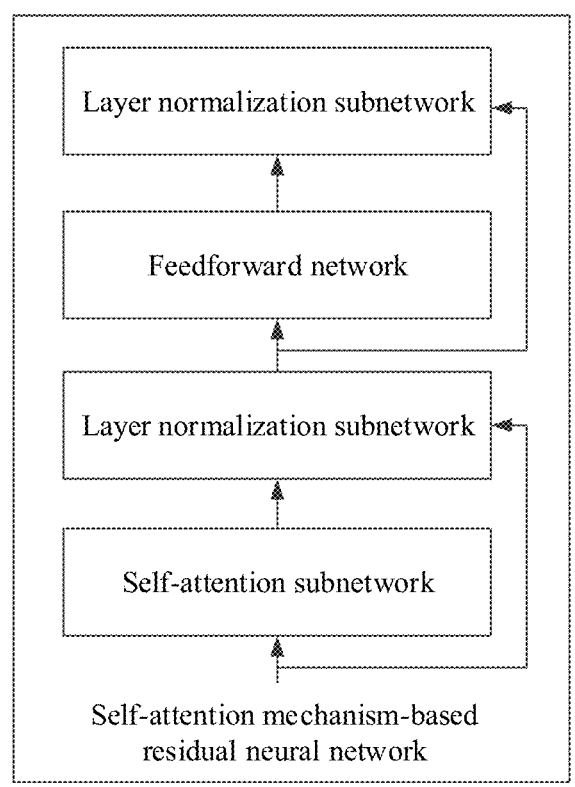
FIG. 5A is a schematic diagram of a self-attention mechanism-based residual neural network according to an embodiment of this application.

When the semantic information of the recognition result includes the named entity information in the recognition result and the semantic association information between the words included in the recognition result, the first machine learning model is a machine learning model in which named entity information in the text and semantic association information between words included in the text can be learned. The first machine learning model may be a self-attention mechanism-based residual neural network model. Correspondingly, a neural network corresponding to the first machine learning model is an attention mechanism-based residual neural network, and an algorithm corresponding to the first machine learning model is an attention mechanism-based residual neural network algorithm. In one embodiment, the neural network corresponding to the first machine learning model includes N self-attention mechanism-based residual neural networks, where N is a positive integer, and in one embodiment, N=3. Each self-attention mechanism-based residual neural network sequentially includes a self-attention subnetwork, a layer normalization subnetwork, a feedforward network, and a layer normalization subnetwork. For details, refer to FIG. 5A. The feedforward network may be a convolutional neural network (CNN).

Figure 5B:
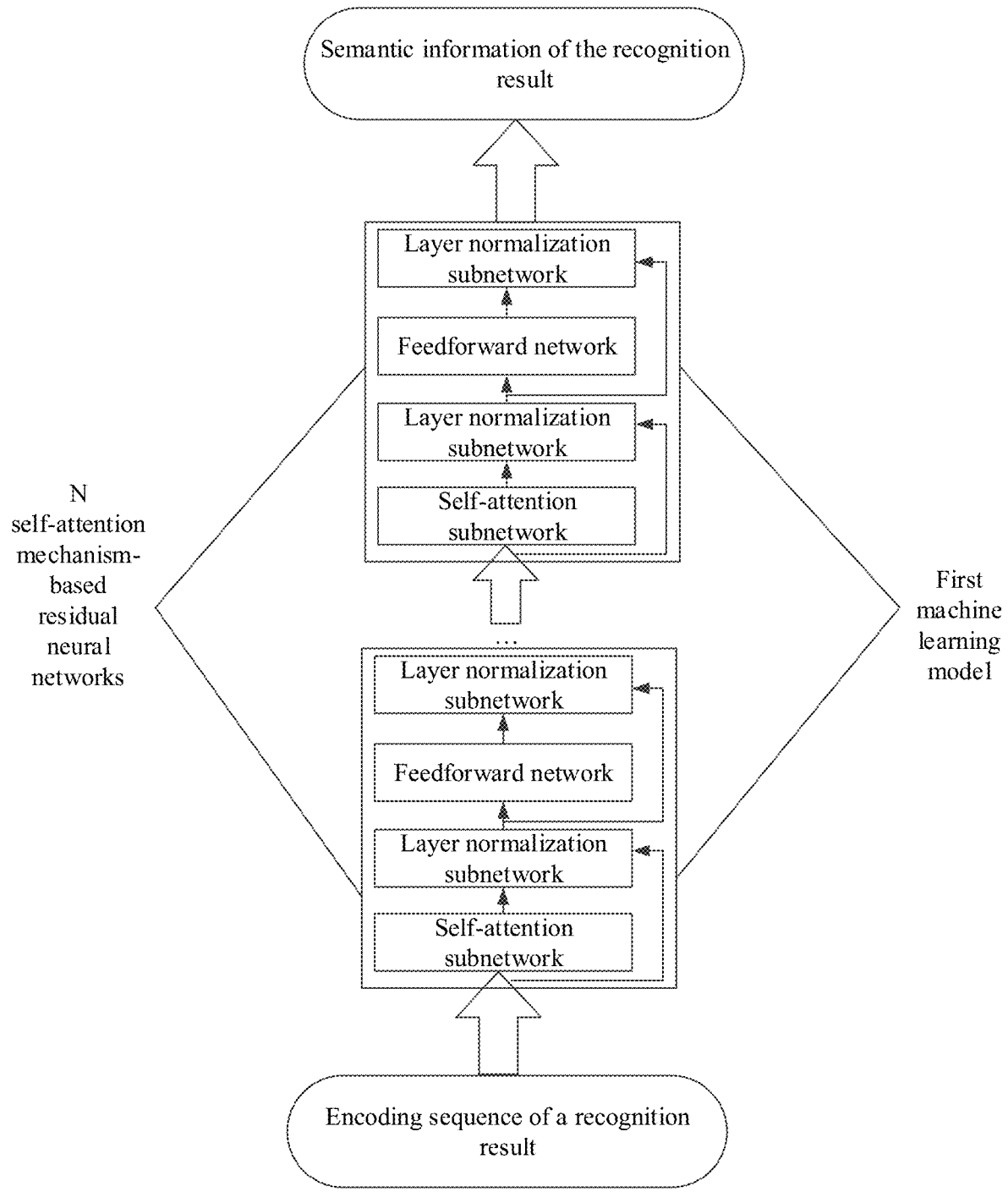
FIG. 5B is a schematic diagram of a process of obtaining semantic information of each recognition result according to an embodiment of this application.

A schematic diagram of a process of obtaining the semantic information of each recognition result based on the encoding sequence of each recognition result and the first machine learning model may be shown in FIG. 5B.

When this embodiment is performed by the terminal device, the method in this embodiment further includes: The terminal device receives the first machine learning model from the server. When this embodiment is performed by the local server, the method in this embodiment further includes: The local server obtains the first machine learning model through training, or the local server receives the first machine learning model from the cloud server. When this embodiment is performed by the cloud server, the method in this embodiment further includes: The cloud server obtains the first machine learning model through training, or the cloud server receives the first machine learning model from another server.

The following describes a method for training the first machine learning model by the server.

The first machine learning model may be obtained in b1 and b2.

b1. Obtain a plurality of first training samples and labels of a plurality of first training texts, where the label of the first training text is used to indicate named entity information corresponding to the first training sample.

b2. Train the first machine learning model based on the plurality of first training samples, labels of the plurality of first training samples, a plurality of second training samples obtained after partial information of each of the plurality of first training samples is masked, and the masked information.

For each first training sample, the first training sample is encoded by using the method for "performing word embedding on the recognition result to obtain the encoding sequence of the recognition result", to obtain an encoding sequence of the first training sample.

For each first training sample, partial information of the first training sample is masked to obtain a second training sample. For each second training sample, the second training sample is encoded by using the method for "performing word embedding on the recognition result to obtain the encoding sequence of the recognition result", to obtain an encoding sequence of the second training sample.

In a training process of the first machine learning model, the first machine model may be obtained through M times of learning. M may be preset, or may be determined based on a value of a loss function in the training process. Two inputs exist in each learning process: The first input is the encoding sequence of the first training sample, and the second input is the encoding sequence of the second training sample obtained after the partial information of the first training sample is masked. The training process of the first machine learning model is described below by using an $m^{th}$ time of learning as an example, where m=1, . . . , and M.

b21. Use an encoding sequence of a first training sample m used for the $m^{th}$ time of learning as an input of a machine learning model obtained in an $(m-1)^{th}$ time of learning, and use a label of the first training sample m as a first expected output of the $m^{th}$ time of learning. After the encoding sequence of the first training sample m is input to the machine learning model obtained in the $(m-1)^{th}$ time of learning, obtain an output by using an algorithm corresponding to the machine learning model obtained in the $(m-1)^{th}$ time of learning, where the output is referred to as a first actual output of the $m^{th}$ time of learning, and obtain a first loss function value based on the first actual output, the first expected output, and a first loss function. To be specific, a first error value is a corresponding error value existing when the expected output is the label of the corresponding first training sample.

b22. Use an encoding sequence of a second training sample m obtained after partial information of the first training sample m is masked as the input of the machine learning model obtained in the $(m-1)^{th}$ time of learning, and use the masked information in the first training sample m as a second expected output of the $m^{th}$ time of learning. After the encoding sequence of the second training sample m is input to the machine learning model obtained in the $(m-1)^{th}$ time of learning, obtain an output by using an algorithm corresponding to the machine learning model obtained in the $(m-1)^{th}$ time of learning, where the output is referred to as a second actual output of the $(m-1)^{th}$ time of learning, and obtain a second loss function value based on the second actual output, the second expected output, and a second loss function. To be specific, a second error value is a corresponding error value existing when the expected output is the masked information in the corresponding first training sample.

b23. Obtain a sum of the first loss function value and the second loss function value, and update, based on the sum, a parameter included in the machine learning model obtained in the $(m-1)^{th}$ time of learning, to obtain a new machine learning model, where the new machine learning model is a machine learning model obtained in the $m^{th}$ time of learning. To be specific, a loss function L used in the training process is $L=L_{NER}+L_{Mask}$, where $L_{NER}$ is the first loss function, and $L_{Mask}$ is the second loss function.

b24. When m is not equal to M, use the machine learning model obtained in the $m^{th}$ time of learning as a new machine learning model obtained in the $(m-1)^{th}$ time of learning, and use a first training sample m+1 used for an $(m+1)^{th}$ time of learning as a new first training sample m. Repeatedly perform b21 to b24 until m=M, to obtain the first machine learning model. When m is equal to M, the machine learning model obtained in the $m^{th}$ time of learning is the first machine learning model.

It may be understood that, a structure of a neural network corresponding to a machine learning model obtained in each time of learning in the training process is the same as a structure of the neural network corresponding to the first machine learning model, and an algorithm corresponding to the machine learning model obtained in each time of learning in the training process is the same as an algorithm corresponding to the first machine learning model. When the neural network corresponding to the first machine learning model is an attention mechanism-based residual neural network and the algorithm corresponding to the first machine learning model is an attention mechanism-based residual neural network algorithm. The neural network corresponding to the machine learning model used for each time of learning in the training process is an attention mechanism-based residual neural network, and the algorithm corresponding to the machine learning model used for each time of learning in the training process is an attention mechanism-based residual neural network algorithm.

It can be learned from descriptions of operations b21 to b24 that, in the training process of the first machine learning model, joint training is performed based on the following two tasks: (1) predicting a masked word by using a word mask method, so that the first machine learning model has a capability of learning a semantic association relationship between words included in the text; (2) obtaining named entity information in the text, so that the first machine learning model has a capability of recognizing a named entity in the text.

To be specific, in this embodiment, the first machine learning model used to obtain the semantic information of the recognition result has both the capability of learning the semantic association relationship between the words included in the text and the capability of recognizing the named entity in the text, so that the obtained semantic information of the recognition result includes the named entity information in the recognition result and the semantic association information between the words included in the recognition result. This can avoid a phenomenon that the current machine learning model used to obtain the semantic information of the text can have only the capability of learning the semantic association relationship between the words included in the text and semantics of the named entity is incorrectly recognized because too much attention is paid to semantic coherence. For example, "portable" in a specific text means a named entity "notebook" instead of "convenient". The first machine learning model in this embodiment can be used to avoid a phenomenon that "portable" in the specific text is recognized as "convenient" to obtain incorrect text semantic information. To be specific, the first machine learning model in this embodiment can be used to improve accuracy of obtaining the semantic information of the recognition result, and further improve accuracy of subsequently determining a most accurate recognition result from the plurality of recognition results of the to-be-recognized text.

Operation S203: Obtain feature information of the image, where the feature information of the image can represent information around the to-be-recognized text in the image.

In embodiments, the feature information of the image may be obtained in c1 to c3.

c1. Obtain layout feature information that is in the image and that is of content included in the image.

In a solution, the obtaining layout feature information that is in the image and that is of content included in the image may include: obtaining information about the image, using the information about the image as an input of a second machine learning model, and learning the image by using an algorithm corresponding to the second machine learning model, to obtain a second vector sequence, where the second vector sequence represents the layout feature information that is in the image and that is of the content included in the image. The information about the image may be a pixel value of the image, or may be other information obtained after the pixel value of the image is processed, for example, a local binary pattern (LBP) value of each pixel in the image.

A neural network corresponding to the second machine learning model may sequentially include a convolutional subnetwork, a dilated convolutional subnetwork, and a deformable convolutional subnetwork. The convolutional subnetwork may include a plurality of convolutional modules (for example, three convolutional modules). The convolutional module may include a convolutional layer, and may further include at least one of the following: a pooling layer, an activation layer, and sampling layer. The dilated convolutional subnetwork may include a plurality of dilated convolutional modules (for example, two dilated convolutional modules). The dilated convolutional module may include a dilated convolutional layer, and may further include at least one of the following: an activation layer and a sampling layer. The deformable convolutional subnetwork may include one or more deformable convolutional modules. The deformable convolutional module may include a deformable convolutional layer, and may further include at least one of the following: a pooling layer, an activation layer, and a sampling layer.

A dilated convolution may increase a receptive field of the convolution, to output information in a large range in the image, and reduce information missing in the image in a convolution process. In a convolutional neural network, the receptive field is a size of an area at which a pixel on a feature map that is output at each layer of the convolutional neural network is mapped on an input picture.

Figure 6B:
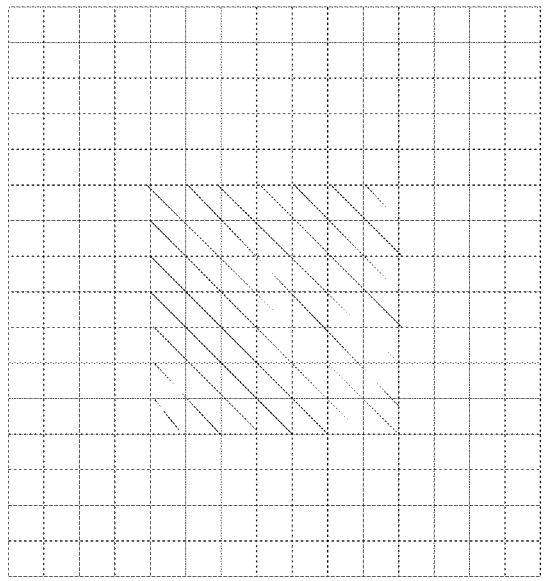
FIG. 6A and FIG. 6B are a diagram of comparison between a standard convolution and a dilated convolution according to an embodiment of this application.
Figure 6A:
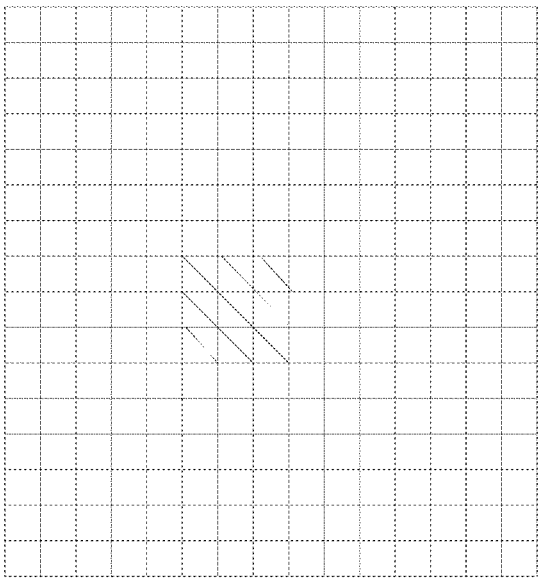

FIG. 6A and FIG. 6B are a diagram of comparison between a standard convolution and a dilated convolution. FIG. 6A is a schematic diagram of a standard convolution. A size of a convolution kernel of the standard convolution is 3×3, and a receptive field of the convolution is 3×3 (shaded part). FIG. 6B is a schematic diagram of a dilated convolution with a dilation rate of 2. A size of a convolution kernel is 3×3, and a receptive field of the convolution is 7×7 (shaded part). It can be learned by comparing FIG. 6A and FIG. 6B that the receptive field of the dilated convolution is larger than the receptive field of the standard convolution, so that each output can include information in a large range in the image.

A deformable convolution means that a convolution kernel adds an additional direction parameter, that is, a shift value, to each element, so that the convolution kernel can be extended to a very large range in a training process, and therefore an interest area of the image is variable, which is suitable for obtaining of a feature of an image with geometric deformation, for example, obtaining of a feature of a text image.

To be specific, when the neural network corresponding to the second machine learning model includes the dilated convolutional subnetwork and/or the deformable convolutional subnetwork, the obtained layout feature information that is in the image and that is of the content included in the image can be comprehensive and accurate.

It may be understood that the second machine learning model is also pre-trained, and the second machine learning model has a capability of learning the layout feature information that is in the image and that is of the content included in the image.

When this embodiment is performed by the terminal device, the method in this embodiment further includes: The terminal device receives the second machine learning model from the server. When this embodiment is performed by the local server, the method in this embodiment further includes: The local server obtains the second machine learning model through training, or the local server receives the second machine learning model from the cloud server. When this embodiment is performed by the cloud server, the method in this embodiment further includes: The cloud server obtains the second machine learning model through training, or the cloud server receives the second machine learning model from another server.

c2. Obtain location feature information of the to-be-recognized text in the image.

The obtaining location feature information of the to-be-recognized text in the image may include: using location information of the to-be-recognized text in the image as an input of a third machine learning model, and learning the location information of the to-be-recognized text in the image by using an algorithm corresponding to the third machine learning model, to obtain a third vector sequence, where the third vector sequence represents the location feature information of the to-be-recognized text in the image. The location information of the to-be-recognized text in the image includes but is not limited to at least one of the following: (1) coordinates of a key point in an area occupied by the to-be-recognized text, where when the area occupied by the to-be-recognized text is a rectangular area, four vertices of the rectangular area are all key points, or when the area occupied by the to-be-recognized text is a non-rectangular area, the area occupied by the to-be-recognized text may be divided into several rectangles, and vertices of the several rectangles are all key points; (2) coordinate information of a central location of the area occupied by the to-be-recognized text; (3) information about a distance between the central location of the area occupied by the to-be-recognized text and a central location of the image; (4) information about the central location of the image; and (5) information about a distance between the to-be-recognized text and content around the to-be-recognized text in the image.

In one embodiment, a neural network corresponding to the third machine learning model may include a convolutional subnetwork (that is, a standard convolutional sublayer) and a spatial pyramid pooling (SPP) subnetwork. The convolutional subnetwork may include a plurality of convolutional modules. SPP has the following characteristics: Regardless of an input size, the SPP can generate a fixed-size output to control a quantity of components in a vector in the third vector sequence to be the same as a quantity of components in a vector in the second vector sequence, so that the layout feature information is subsequently fused with the location feature information of the to-be-recognized text in the image.

It may be understood that the third machine learning model is also pre-trained by the server, and the third machine learning model has a capability of learning the location feature information of the text in the image.

When this embodiment is performed by the terminal device, the method in this embodiment further includes: The terminal device receives the third machine learning model from the server. When this embodiment is performed by the local server, the method in this embodiment further includes: The local server obtains the third machine learning model through training, or the local server receives the third machine learning model from the cloud server. When this embodiment is performed by the cloud server, the method in this embodiment further includes: The cloud server obtains the third machine learning model through training, or the cloud server receives the third machine learning model from another server.

c3. Obtain the feature information of the image based on the layout feature information and the location feature information of the to-be-recognized text in the image.

The obtaining the feature information of the image based on the layout feature information and the location feature information of the to-be-recognized text in the image may include:

c31. Fuse the layout feature information and the location feature information of the to-be-recognized text in the image to obtain preliminary feature information of the image.

The fusing the layout feature information and the location feature information of the to-be-recognized text in the image to obtain preliminary feature information of the image includes: adding each vector in the second vector sequence and a corresponding vector in each vector in the third vector sequence to obtain a fourth vector sequence, where the second vector sequence is used to represent the layout feature information, and the third vector sequence is used to represent the location feature information of the to-be-recognized text in the image.

In this embodiment, adding the two vectors means that a $q^{th}$ component included in a first vector in the two vectors is added to a $q^{th}$ component included in a second vector in the two vectors, where q=1, 2, ..., and Q, and Q is a quantity of components included in a vector.

c32. Perform pooling processing on the preliminary feature information of the image to obtain preselected feature information of the image.

Average pooling processing may be performed on the preliminary feature information of the image to obtain the preselected feature information of the image. To be specific, average pooling is performed on the fourth vector sequence to obtain a fifth vector sequence.

c33. Combine the preselected feature information of the image and the location feature information of the to-be-recognized text in the image to obtain the feature information of the image.

To be specific, each vector in the fifth vector sequence is combined with a corresponding vector in the third vector sequence to obtain the fifth vector sequence, where the fifth vector sequence is used to represent the feature information of the image.

In this embodiment, combining the two vectors means that components in the two vectors form one vector. For example, a vector 1 includes k1 components, a vector 2 includes k2 components, and a vector including k1+k2 components is obtained after the vector 1 and the vector 2 are combined.

It can be learned from descriptions of c1 to c3 that, in this embodiment, the layout feature information that is in the image and that is of the content included in the image and the location feature information of the to-be-recognized text in the image are fused, and the feature information of the image is obtained after the combination, and can represent content information around the to-be-recognized text in the image.

Figure 7A:
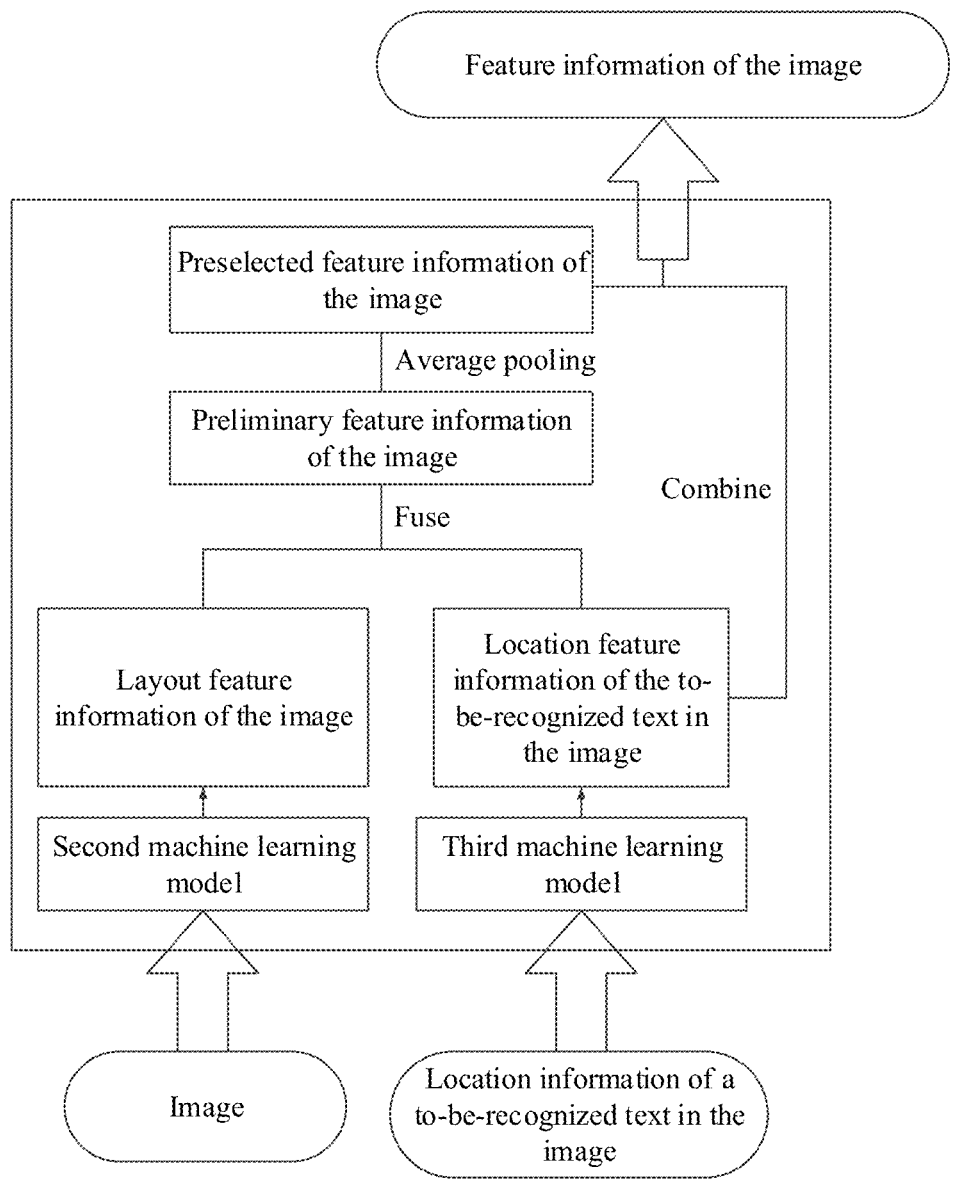
FIG. 7A is a schematic diagram of a process of obtaining feature information of an image according to an embodiment of this application.
Figure 7B:
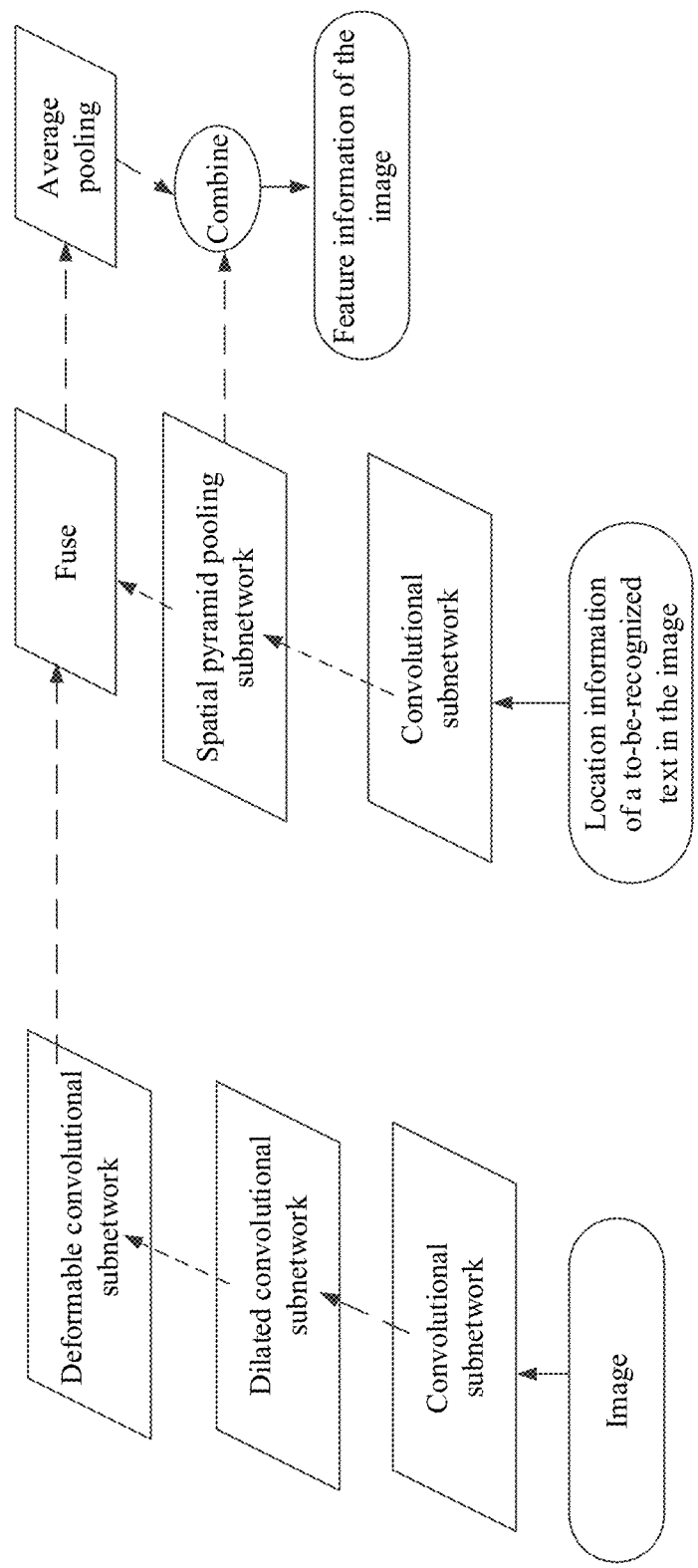
FIG. 7B is a schematic diagram of a neural network for obtaining feature information of an image according to an embodiment of this application.

In conclusion, a schematic diagram of a process of obtaining the feature information of the image may be shown in FIG. 7A, and a schematic diagram of a neural network for obtaining the feature information of the image may be shown in FIG. 7B. Refer to FIG. 7A, when the feature information of the image is obtained, the layout feature information that is in the image and that is of the content included in the image is obtained based on overall information of the image, the location feature information of the to-be-recognized text in the image is obtained based on location information of the to-be-recognized text in the image, and the feature information of the image is finally obtained based on the layout feature information that is in the image and that is of the content included in the image and the location feature information of the to-be-recognized text in the image.

Operation S204: Determine a target recognition result of the to-be-recognized text from the plurality of recognition results based on the feature information of the image and the semantic information of the plurality of recognition results.

In a solution, the target recognition result may be determined from the plurality of recognition results based on the feature information of the image and the semantic information of the plurality of recognition results in d1 and d2.

d1: Use the feature information of the image and the semantic information of the plurality of recognition results as an input of an attention mechanism-based neural network model, and obtain a target label by using an attention mechanism-based neural network algorithm, where the target label is used to indicate a probability that a recognition result obtained by using each recognition method is the target recognition result.

In embodiments, the feature information of the image and the semantic information of the recognition results are used as the input of the attention mechanism-based neural network model, and the target label is output by using the attention mechanism-based neural network algorithm, where the target label can be used to indicate the probability that each recognition result obtained by using each recognition method is the target recognition result. The target recognition result in this embodiment is a most accurate recognition result in the plurality of recognition results. Therefore, the target label may be used to indicate a probability that each recognition result obtained by using each recognition method is the most accurate target recognition result. The attention mechanism-based neural network algorithm may be an attention mechanism-based LSTM neural network algorithm.

The target label may be a vector, and a quantity of components in the vector is the same as a quantity of used recognition methods, that is, the same as a quantity of recognition results. Each component in the vector corresponds to a recognition result obtained by using a recognition method. For example, the target label includes three components, the first component corresponds to a recognition result obtained by using a recognition method 1, the second component corresponds to a recognition result obtained by using a recognition method 2, and the third component corresponds to a recognition result obtained by using a recognition method 3. In this case, when the target label is (0.9, 0.05, 0.05), the target label indicates that a probability that the recognition result obtained by using the recognition method 1 is the most accurate recognition result is 0.9, a probability that the recognition result obtained by using the recognition method 2 is the most accurate recognition result is 0.05, and a probability that the recognition result obtained by using the recognition method 3 is the most accurate recognition result is 0.05.

Because the feature information of the image can represent the information around the to-be-recognized text in the image, if a recognition result includes the information around the to-be-recognized text, the feature information of the image is introduced to determine that the recognition result includes information that is not the information around the to-be-recognized text, and therefore the recognition result may not be determined as the most accurate recognition result. To be specific, in this embodiment, the most accurate recognition result is determined from the plurality of recognition results based on the feature information of the image and the semantic information of the recognition results by using the attention mechanism-based neural network model, so that accuracy of determining the most accurate recognition result can be improved.

For example, still refer to FIG. 4. The to-be-recognized text is "The contract due date is Oct. 1, 2019" and "The contract due date is Oct. 1, 2019" is located in a table. The to-be-recognized text in the image is recognized respectively by using a recognition method 1, a recognition method 2, and a recognition method 3. In this case, a recognition result 1 obtained by using the recognition method 1 is: The contract due date is Oct. 1, 2019, a recognition result 2 obtained by using the recognition method 2 is: |The contract due date is Oct. 1, 2019, and a recognition result 3 obtained by using the recognition method 3 is: The contract due data is Oct. 1, 2019. After the feature information of the image is introduced, it can be learned that the information about the to-be-recognized text "The contract due date is Oct. 1, 2019" includes a table. In this case, it can be learned that "|" in the recognition result 2 "|The contract due date is Oct. 1, 2019" is a border of the table. When the recognition result 1 "The contract due date is Oct. 1, 2019" exists, it can be learned that the recognition result 2 is not the most accurate recognition result in the three recognition results.

For obtaining the attention mechanism-based neural network model, when this embodiment is performed by the terminal device, the method in this embodiment further includes: The terminal device receives the attention mechanism-based neural network model from the server. When this embodiment is performed by the local server, the method in this embodiment further includes: The local server obtains the attention mechanism-based neural network model through training, or the local server receives the attention mechanism-based neural network model from the cloud server. When this embodiment is performed by the cloud server, the method in this embodiment further includes: The cloud server obtains the attention mechanism-based neural network model through training, or the cloud server receives the attention mechanism-based neural network model from another server.

The following describes a method in which the server obtains the attention mechanism-based neural network model.

The attention mechanism-based neural network model is trained by using a large quantity of training samples. Each training sample has a label, and the label of the training sample indicates a probability that each recognition result obtained after a training sample is recognized by using each recognition method is a most accurate recognition result. The label of the training sample is a vector, a quantity of components in the vector is the same as a quantity of recognition methods, and each component corresponds to a recognition result obtained by using a recognition method. Because a most accurate recognition result in recognition results obtained after training samples are recognized by using recognition methods is known, if it is known that a recognition result obtained after a training sample is recognized by using a first recognition method in the recognition methods is the most accurate recognition result, a probability that the recognition result obtained by using the first recognition method is the most accurate recognition result is 1, and a probability that a recognition result obtained by using another recognition method is the most accurate recognition result is 0. In this case, when there are three recognition methods and a first component in the label corresponds to the recognition result obtained by using the first recognition method, the label of the training sample may be (1, 0, 0). In operation S201 to operation S203, based on each training sample, the semantic information that is of each recognition result and that corresponds to the training sample and the feature information that is of the image and that corresponds to the training sample are obtained. The attention mechanism-based neural network model is obtained through training by using the attention mechanism-based neural network algorithm based on the semantic information of the recognition results that corresponds to the large quantity of training samples, the feature information that is of the image and that corresponds to the training samples, and labels of the large quantity of training samples.

d2: Determine the target recognition result of the to-be-recognized text from the plurality of recognition results based on a similarity between the target label and each preset label, where each preset label corresponds to a recognition result obtained by using a recognition method.

In a manner, the determining the target recognition result of the to-be-recognized text from the plurality of recognition results based on a similarity between the target label and each preset label includes: determining that a largest similarity between the target label and each preset label is greater than a preset similarity; and determining that a recognition result obtained by using a recognition method corresponding to a preset label that has a largest similarity with the target label is the target recognition result. The similarity may be obtained by calculating a cosine similarity between the target label and the preset label, or the similarity may be obtained by calculating a Euclidean distance between the target label and the preset label. This is not limited in this embodiment.

The preset label may be a vector, and a quantity of components in the vector is the same as a quantity of used recognition methods, that is, the same as a quantity of recognition results. A quantity of preset labels is also the same as a quantity of recognition methods or a quantity of recognition results, and each preset label corresponds to a recognition result obtained by using a recognition method. That the preset label corresponds to a recognition result obtained by using a recognition method means that if the preset label indicates that a probability that a recognition result obtained by using a recognition method is a most accurate recognition result is 1, the preset label corresponds to the recognition result obtained by using the recognition method.

For example, there are three methods for recognizing a text in an image: a recognition method a, a recognition method b, and a recognition method c, and three preset labels may be respectively (1, 0, 0), (0, 1, 0), and (0, 0, 1). (1, 0, 0) indicates that a probability that a recognition result obtained by using the recognition method a is the most accurate recognition result is 1, that is, (1, 0, 0) corresponds to the recognition result obtained by using the recognition method a. (0, 1, 0) indicates that a probability that a recognition result obtained by using the recognition method b is the most accurate recognition result is 1, that is, (0, 1, 0) corresponds to the recognition result obtained by using the recognition method b. (0, 0, 1) indicates that a probability that a recognition result obtained by using the recognition method c is the most accurate recognition result is 1, that is, (0, 0, 1) corresponds to the recognition result obtained by using the recognition method c.

It may be understood that, labels of training samples in a large quantity of training samples used to train the attention mechanism-based neural network model are all preset labels.

Figure 8:
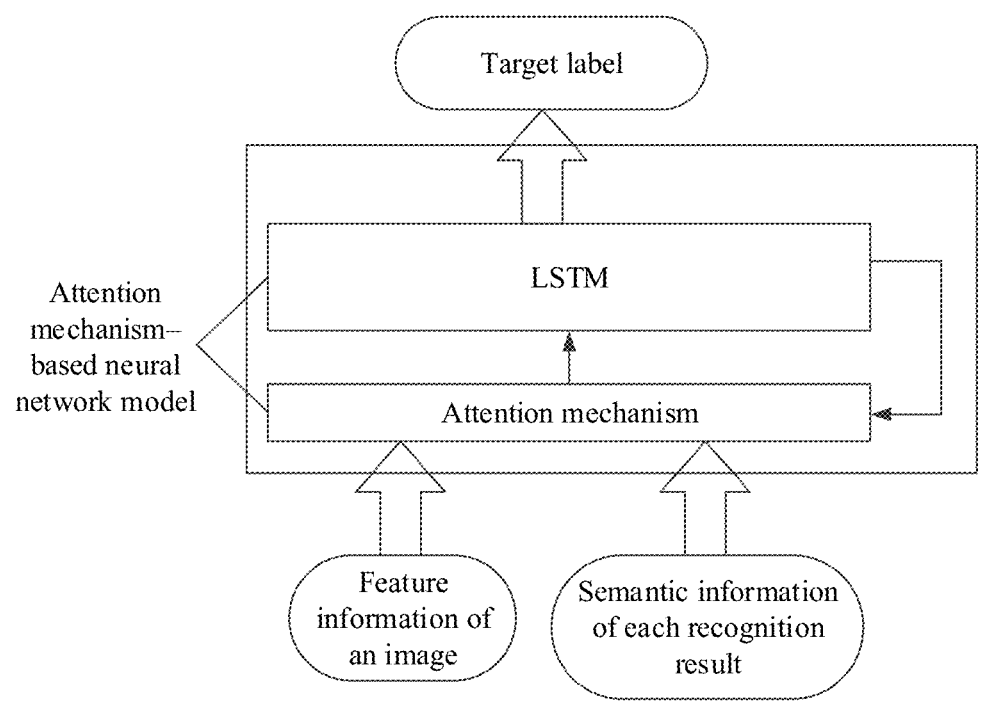
FIG. 8 is a schematic diagram of a process of determining a target recognition result of a to-be-recognized text based on feature information of an image and semantic information of a plurality of recognition results according to an embodiment of this application.

In conclusion, a schematic diagram of a process of determining the target recognition result of the to-be-recognized text from the plurality of recognition results based on the feature information of the image and the semantic information of the plurality of recognition results may be shown in FIG. 8.

Figure 9:
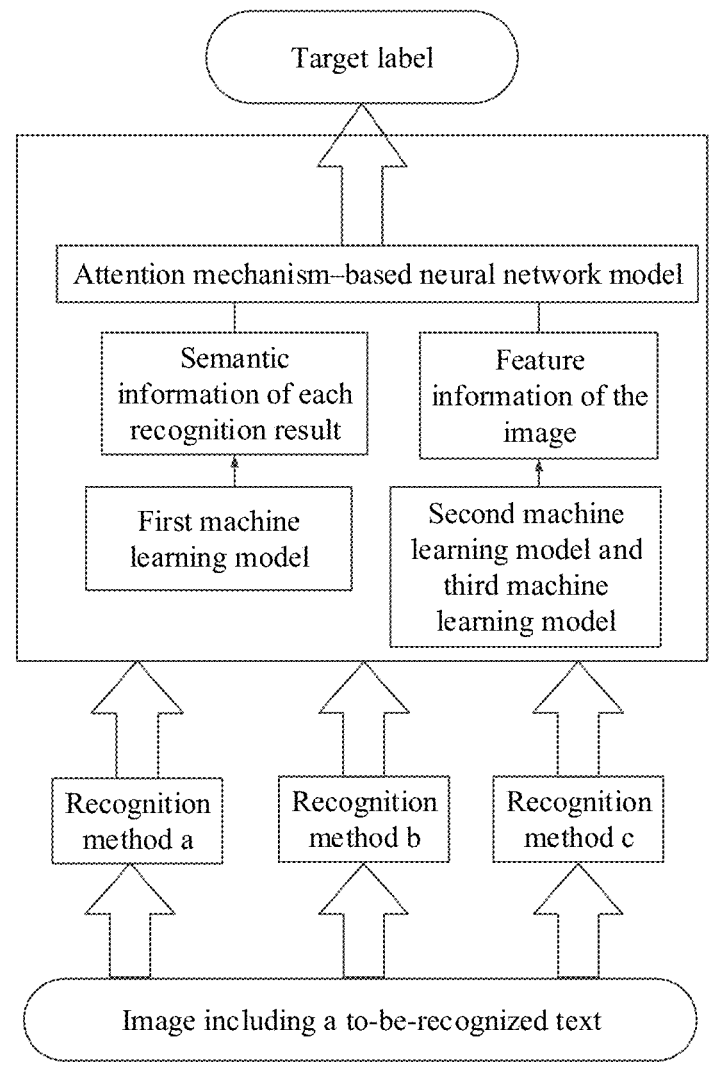
FIG. 9 is a schematic diagram of a process of recognizing a text in an image according to an embodiment of this application.

Based on descriptions of operation S201 to operation S204, a schematic diagram of a process of recognizing a text in an image according to an embodiment may be shown in FIG. 9.

According to the method for recognizing a text in an image in this embodiment, after the plurality of recognition results are obtained by using the plurality of methods, accurate semantic information of each recognition result is obtained by using a machine learning model having a capability of recognizing named entity information, the most accurate recognition result is determined from the plurality of recognition results based on the feature information that is of the image and that can represent the information around the to-be-recognized text in the image, and the determined most accurate recognition result is used as the recognition result of the text in the image. Because the feature information that is of the image and that can represent the information around the to-be-recognized text in the image is combined when the most accurate recognition result is determined from the plurality of recognition results, accuracy of determining the most accurate recognition result from the plurality of recognition results is improved. In other words, according to the method in this embodiment, a precise recognition result of the text in the image can be obtained.

The foregoing describes the method for recognizing a text in an image in this application. The following describes an apparatus and a system in this application.

Figure 10:
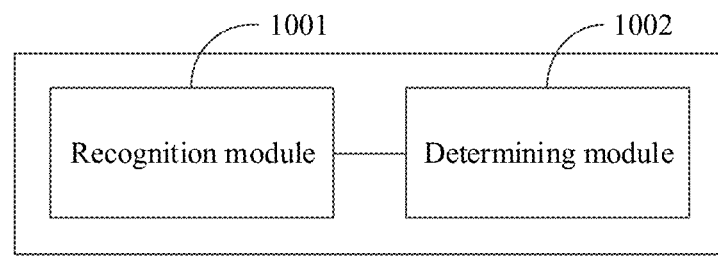
FIG. 10 is a schematic diagram 1 of an apparatus for recognizing a text in an image according to an embodiment of this application.

FIG. 10 is a schematic diagram 1 of an apparatus for recognizing a text in an image according to an embodiment of this application. Refer to FIG. 10. The apparatus in this embodiment includes a recognition module 1001 and a determining module 1002.

The recognition module 1001 is configured to obtain a plurality of recognition results of a to-be-recognized text in an image according to a plurality of recognition methods.

The determining module 1002 is configured to: obtain semantic information of the recognition results; obtain feature information of the image, where the feature information of the image can represent information around the to-be-recognized text in the image; and determine a target recognition result of the to-be-recognized text from the plurality of recognition results based on the feature information of the image and the semantic information of the plurality of recognition results.

In one embodiment, the semantic information of the recognition result includes named entity information in the recognition result and semantic association information between words included in the recognition result.

In one embodiment, the determining module 1002 is specifically configured to:
obtain layout feature information that is in the image and that is of content included in the image;
obtain location feature information of the to-be-recognized text in the image; and
obtain the feature information of the image based on the layout feature information and the location feature information of the to-be-recognized text in the image.

In one embodiment, the determining module 1002 is specifically configured to:
fuse the layout feature information and the location feature information of the to-be-recognized text in the image to obtain preliminary feature information of the image;
perform pooling processing on the preliminary feature information of the image to obtain preselected feature information of the image; and
combine the preselected feature information of the image and the location feature information of the to-be-recognized text in the image to obtain the feature information of the image.

In one embodiment, the layout feature information that is in the image and that is of the content included in the image is obtained based on a second machine learning model, and a neural network corresponding to the second machine learning model includes at least one of the following subnetworks: a convolutional subnetwork, a dilated convolutional subnetwork, and a deformable convolutional subnetwork.

In one embodiment, the location feature information of the to-be-recognized text in the image is obtained based on a third machine learning model, and a neural network corresponding to the third machine learning model includes a convolutional subnetwork.

In one embodiment, the neural network corresponding to the third machine learning model further includes a spatial pyramid pooling subnetwork.

In one embodiment, the determining module 1002 is specifically configured to:
use the feature information of the image and the semantic information of the recognition results as an input of an attention mechanism-based neural network model, and output a target label by using an attention mechanism-based neural network algorithm, where the target label indicates a probability that each recognition result is the target recognition result; and
determine the target recognition result of the to-be-recognized text from the plurality of recognition results based on a similarity between the target label and each preset label, where each preset label corresponds to a recognition result obtained by using a recognition method.

The apparatus in this embodiment may be configured to perform the technical solutions of the foregoing method embodiments. Implementation principles and technical effects of the apparatus are similar to those of the foregoing method embodiments. Details are not described herein again. The apparatus in this embodiment may be all or a part of a terminal device or a server, and the server may be a cloud server or a local server.

Figure 11:
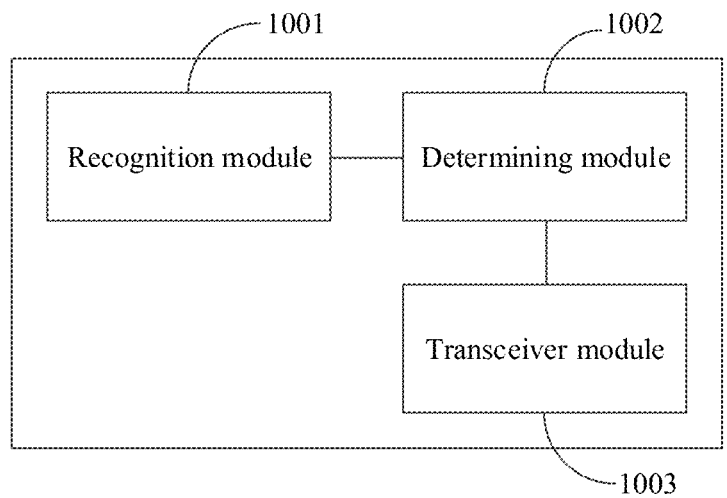
FIG. 11 is a schematic diagram 2 of an apparatus for recognizing a text in an image according to an embodiment of this application.

FIG. 11 is a schematic diagram 2 of an apparatus for recognizing a text in an image according to an embodiment of this application. Refer to FIG. 11. The apparatus in this embodiment further includes a transceiver module 1003 based on the apparatus shown in FIG. 10.

The semantic information of the recognition result in the embodiment shown in FIG. 10 is obtained based on a first machine learning model.

The transceiver module 1003 is configured to receive at least one of the following: the first machine learning model, the second machine learning model, the third machine learning model, and the attention mechanism-based neural network model.

The apparatus in this embodiment may be configured to perform the technical solutions of the foregoing method embodiments. Implementation principles and technical effects of the apparatus are similar to those of the foregoing method embodiments. Details are not described herein again. The apparatus in this embodiment may be all or a part of a terminal device or a server, and the server may be a cloud server or a local server.

Figure 12:
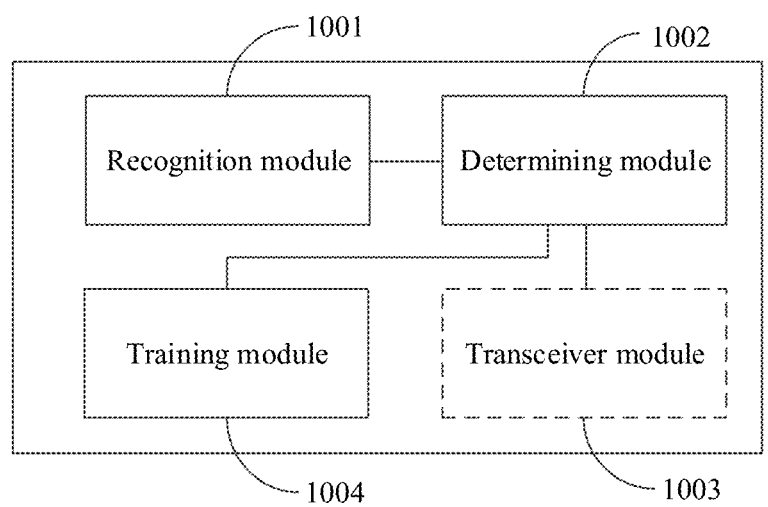
FIG. 12 is a schematic diagram 3 of an apparatus for recognizing a text in an image according to an embodiment of this application.

FIG. 12 is a schematic diagram 3 of an apparatus for recognizing a text in an image according to an embodiment of this application. Refer to FIG. 12. The apparatus in this embodiment further includes a training module 1004 based on the apparatus shown in FIG. 10 or FIG. 11.

The training module 1004 is configured to obtain at least one of the following through training: the first machine learning model, the second machine learning model, the third machine learning model, and the attention mechanism-based neural network model. The semantic information of the recognition result in the embodiment shown in FIG. 10 is obtained based on the first machine learning model.

In one embodiment, the training module 1004 is specifically configured to: obtain a plurality of first training samples and a label of each first training text, where the label of the first training text is used to indicate named entity information corresponding to the first training sample; and train the first machine learning model based on the plurality of first training samples, labels of the plurality of first training samples, a plurality of second training samples obtained after partial information of each of the plurality of first training samples is masked, and the masked information.

In one embodiment, loss functions used to train the first machine learning model include a first loss function and a second loss function; and the first loss function is a loss function related to predicting the named entity information of the first training sample, and the second loss function is a loss function related to predicting the masked information.

The apparatus in this embodiment may be configured to perform the technical solutions of the foregoing method embodiments. Implementation principles and technical effects of the apparatus are similar to those of the foregoing method embodiments. Details are not described herein again. The apparatus in this embodiment may be all or a part of a server, and the server may be a cloud server or a local server.

Figure 13:
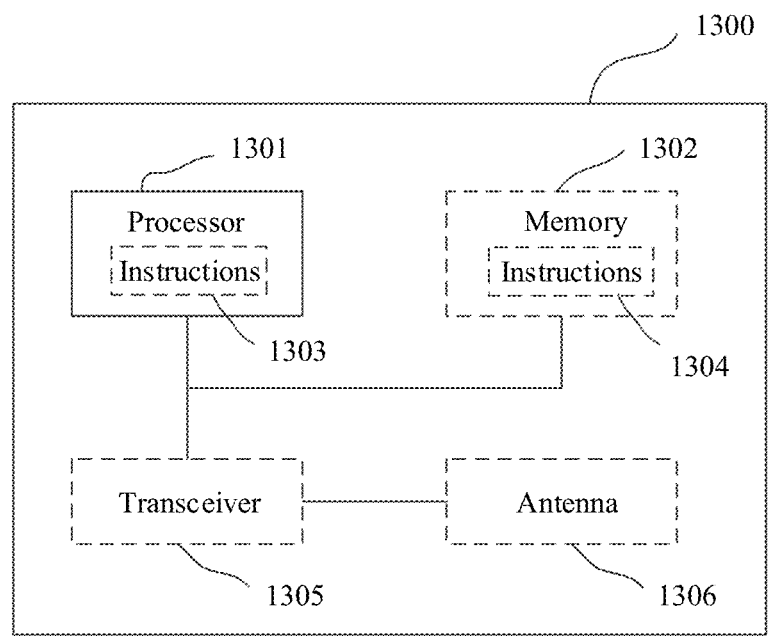
FIG. 13 is a schematic block diagram of an implementation of an electronic device according to an embodiment of this application.

FIG. 13 is a schematic block diagram of an implementation of an electronic device according to an embodiment of this application. The electronic device in this embodiment may be a server or a terminal device, may be a chip, a chip system, a processor, or the like that supports the server or the terminal device in implementing the foregoing method, or may be a chip, a chip system, a processor, or the like that supports implementing the foregoing method. The electronic device may be configured to implement the method corresponding to the terminal device or the server described in the foregoing method embodiments. For details, refer to descriptions in the foregoing method embodiments. The server may be a local server or a cloud server.

The electronic device may include one or more processors 1301, and the processor 1301 may also be referred to as a processing unit, and may implement a specific control function. The processor 1301 may be a general-purpose processor, a dedicated processor, or the like.

In an optional design, the processor 1301 may also store instructions and/or data 1303, and the instructions and/or data 1303 may be run on the processor, so that the electronic device performs the method described in the foregoing method embodiments.

In another optional design, the processor 1301 may include a transceiver unit configured to implement a receiving function and a sending function. For example, the transceiver unit may be a transceiver circuit, an interface, or an interface circuit. The transceiver circuit, the interface, or the interface circuit configured to implement the receiving function and the sending function may be separated, or may be integrated. The transceiver circuit, the interface, or the interface circuit may be configured to: read and write code/data. Alternatively, the transceiver circuit, the interface, or the interface circuit may be configured to: transmit or transfer a signal.

In one embodiment, the electronic device may include one or more memories 1302, and the memory 1302 may store instructions 1304. The instructions may be run on the processor, so that the electronic device performs the method described in the foregoing method embodiments. In one embodiment, the memory may further store data. In one embodiment, the processor may also store instructions and/or data. The processor and the memory may be disposed separately, or may be integrated. For example, the correspondences described in the foregoing method embodiments may be stored in the memory or stored in the processor.

In one embodiment, the electronic device may further include a transceiver 1305 and/or an antenna 1306. The processor 1301 may be referred to as a processing unit that controls the electronic device. The transceiver 1305 may be referred to as a transceiver unit, a transceiver machine, a transceiver circuit, or the like, and is configured to implement transceiver functions.

The processor and the transceiver described in this embodiment may be manufactured by using various IC process technologies, such as a complementary metal oxide semiconductor (CMOS), an N-channel metal oxide semiconductor (NMOS), a p-channel metal oxide semiconductor (PMOS), a bipolar junction transistor (BJT), a bipolar CMOS (BiCMOS), silicon germanium (SiGe), and gallium arsenide (GaAs).

It should be understood that the processor in the embodiments of this application may be an integrated circuit chip, and has a signal processing capability. In an implementation process, the operations in the foregoing method embodiments may be completed by using a hardware integrated logic circuit in a processor or instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component.

It may be understood that the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through an example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, the memory in the system and method described in this specification includes but is not limited to these memories and any memory of another proper type.

A scope of the electronic device described in this embodiment of this application is not limited thereto, and a structure of the electronic device may not be limited in FIG. 13. The electronic device described in this embodiment of this application may be an independent device or may be a part of a larger device.

Figure 14:
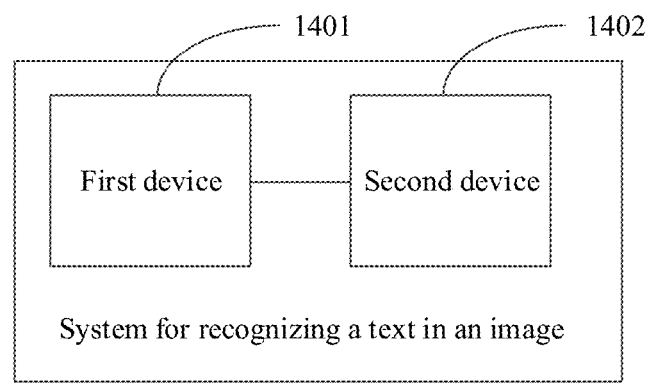
FIG. 14 is a schematic block diagram of a system for recognizing a text in an image according to an embodiment of this application.

FIG. 14 is a schematic block diagram of a system for recognizing a text in an image according to an embodiment of this application. Refer to FIG. 14. The system in this embodiment includes a first device 1401 and a second device 1402.

The first device 1401 is configured to send at least one machine learning model to the second device 1402.

The second device 1402 is configured to:

obtain a plurality of recognition results of a to-be-recognized text in an image according to a plurality of recognition methods; and based on a plurality of machine learning models, obtain semantic information of the recognition results, and obtain feature information of the image; and determine a target recognition result from the plurality of recognition results based on the feature information and the semantic information, where the feature information of the image can represent information around the to-be-recognized text in the image, and the plurality of machine learning models include the at least one machine learning model.

In one embodiment, the plurality of machine learning models include a first machine learning model. The second device 1402 is specifically configured to obtain the semantic information of the recognition results based on the first machine learning model, where the semantic information of the recognition result includes named entity information in the recognition result and semantic association information between words included in the recognition result.

In one embodiment, the plurality of machine learning models include a second machine learning model and a third machine learning model. The second device 1402 is specifically configured to: obtain, based on the second machine learning model, layout feature information that is in the image and that is of content included in the image; obtain location feature information of the to-be-recognized text in the image based on the third machine learning model; and obtain the feature information of the image based on the layout feature information and the location feature information of the to-be-recognized text in the image.

In one embodiment, when the second device 1402 is configured to obtain the feature information of the image based on the layout feature information and the location feature information of the to-be-recognized text in the image, the second device 1402 is specifically configured to: fuse the layout feature information and the location feature information of the to-be-recognized text in the image to obtain preliminary feature information of the image; perform pooling processing on the preliminary feature information of the image to obtain preselected feature information of the image; and combine the preselected feature information of the image and the location feature information of the to-be-recognized text in the image to obtain the feature information of the image.

In one embodiment, the plurality of machine learning models further include an attention mechanism-based neural network model. The second device 1402 is specifically configured to: use the feature information of the image and the semantic information of the recognition results as an input of the attention mechanism-based neural network model, and output a target label by using an attention mechanism-based neural network algorithm, where the target label indicates a probability that each recognition result is the target recognition result; and determine the target recognition result of the to-be-recognized text from the plurality of recognition results based on a similarity between the target label and each preset label, where each preset label corresponds to a recognition result obtained by using a recognition method.

In one embodiment, the at least one machine learning model includes the first machine learning model. Before the first device 1401 sends the first machine learning model to the second device 1402, the first device 1401 is further configured to: obtain a plurality of first training samples and a label of each first training text, where the label of the first training text is used to indicate named entity information corresponding to the first training sample; and train the first machine learning model based on the plurality of first training samples, labels of the plurality of first training samples, a plurality of second training samples obtained after partial information of each of the plurality of first training samples is masked, and the masked information.

In one embodiment, loss functions used when the first device 1401 trains the first machine learning model include a first loss function and a second loss function; and the first loss function is a loss function related to predicting the named entity information of the first training sample, and the second loss function is a loss function related to predicting the masked information.

In one embodiment, the at least one machine learning model does not include the first machine learning model. Before the second device 1402 obtains the semantic information of the recognition results, the second device is further configured to: obtain a plurality of first training samples and a label of each first training text, where the label of the first training text is used to indicate named entity information corresponding to the first training sample; and train the first machine learning model based on the plurality of first training samples, labels of the plurality of first training samples, a plurality of second training samples obtained after partial information of each of the plurality of first training samples is masked, and the masked information.

In one embodiment, a neural network corresponding to the second machine learning model includes at least one of the following subnetworks: a convolutional subnetwork, a dilated convolutional subnetwork, and a deformable convolutional subnetwork.

In one embodiment, a neural network corresponding to the third machine learning model includes a convolutional subnetwork.

In one embodiment, the neural network corresponding to the third machine learning model further includes a spatial pyramid pooling subnetwork.

In one embodiment, the at least one machine learning model includes the second machine learning model. Before the first device 1401 sends the second machine learning model to the second device 1402, the first device 1401 is further configured to train the second machine learning model.

In one embodiment, the at least one machine learning model includes the third machine learning model. Before the first device 1401 sends the third machine learning model to the second device 1402, the first device 1401 is further configured to train the third machine learning model.

In one embodiment, before the first device 1401 sends the attention mechanism-based neural network model to the second device 1402, the first device 1401 is further configured to train the attention mechanism-based neural network model.

In one embodiment, the first device 1401 is a terminal device, and the second device 1402 is a local server or a cloud server. Alternatively, the first device 1401 is a local server, and the second device 1402 is a cloud server.

The system in this embodiment may be configured to perform the technical solution in the foregoing method embodiment, and an implementation principle and a technical effect of the system are similar to those in the foregoing method embodiment. Details are not described herein again.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

When software is used to implement the embodiments, the embodiments may be implemented completely or partially in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive SSD)), or the like.

In the several embodiments provided in this application, it should be understood that the disclosed system, apparatus, and method may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

Units described as separate parts may or may not be physically separate, and parts displayed as units may or may not be physical units, and may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods in the embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

It should be understood that "an embodiment" mentioned in the entire specification means that particular features, structures, or characteristics related to the embodiments are included in at least one embodiment of this application. Therefore, the embodiments in the entire specification are not necessarily same embodiments. In addition, these particular features, structures, or characteristics may be combined in one or more embodiments in any proper manner. It should be understood that sequence numbers of the foregoing processes do not mean execution sequences in the embodiments of this application. The execution sequences of the processes should be determined based on functions and internal logic of the processes, and should not be construed as any limitation to the implementation processes of the embodiments of this application.

It should be further understood that, in this application, both "when" and "if" mean that the terminal device or the server performs corresponding processing in an objective situation, are not intended to limit time, do not require that the terminal device or the server needs to perform a determining action during implementation, and do not mean that there is another limitation.

In this application, unless otherwise specified, an element represented in a singular form is intended to represent "one or more", but is not intended to represent "only one". In this application, unless otherwise specified, "at least one" is intended to represent "one or more", and "a plurality of" is intended to represent "two or more".

In addition, the term "and/or" in this specification describes only an association relationship for describing associated objects and represents that three relationships may exist. For example, A and/or B may represent the following three cases: Only A exists, both A and B exist, and only B exists. A may be singular or plural, and B may be singular or plural.

The character "/" usually represents an "or" relationship between the associated objects.

The term "at least one of . . . " in this specification indicates all or any combination of listed items. For example, "at least one of A, B, and C" may indicate the following six cases: Only A exists, only B exists, only C exists, both A and B exist, both B and C exist, and A, B, and C exist. A may be singular or plural, B may be singular or plural, and C may be singular or plural.

It should be understood that in the embodiments of this application, "B corresponding to A" indicates that B is associated with A, and B may be determined based on A. However, it should be further understood that determining B based on A does not mean that B is determined based on A only, and B may also be determined based on A and/or other information.

What is claimed is:

1. A method for recognizing a to-be-recognized text in an image, comprising:
obtaining a plurality of recognition results of the to-be-recognized text in the image according to a plurality of recognition methods;
training a first machine learning model based on a plurality of first training samples, labels of the plurality of first training samples, a plurality of second training samples obtained after partial information of each of the plurality of first training samples is masked, and masked information;
obtaining semantic information of the plurality of recognition results based on the first machine learning model;
obtaining feature information of the image, wherein the feature information of the image represents information around the to-be-recognized text in the image; and
determining a target recognition result of the to-be-recognized text from the plurality of recognition results based on the feature information of the image and the semantic information of the plurality of recognition results.

2. The method according to claim 1, wherein the semantic information of a recognition result of the plurality of recognition results comprises named entity information in the recognition result and semantic association information between words comprised in the recognition result.

3. The method according to claim 1, wherein the obtaining feature information of the image comprises:
obtaining layout feature information that is in the image and that is of content comprised in the image;
obtaining location feature information of the to-be-recognized text in the image; and
obtaining the feature information of the image based on the layout feature information and the location feature information of the to-be-recognized text in the image.

4. The method according to claim 3, wherein the obtaining the feature information of the image based on the layout feature information and the location feature information of the to-be-recognized text in the image comprises:
fusing the layout feature information and the location feature information of the to-be-recognized text in the image to obtain preliminary feature information of the image;
performing pooling processing on the preliminary feature information of the image to obtain preselected feature information of the image; and
combining the preselected feature information of the image and the location feature information of the to-be-recognized text in the image to obtain the feature information of the image.

5. The method according to claim 1, wherein the determining the target recognition result from the plurality of recognition results based on the feature information of the image and the semantic information of the plurality of recognition results comprises:
using the feature information of the image and the semantic information of the recognition results as an input of an attention mechanism-based neural network model, and outputting a target label by using an attention mechanism-based neural network algorithm, wherein the target label indicates a probability that each recognition result is the target recognition result; and
determining the target recognition result of the to-be-recognized text from the plurality of recognition results based on a similarity between the target label and each preset label, wherein each preset label corresponds to a recognition result obtained by using a recognition method of the plurality of recognition methods.

6. The method according to claim 1, the method further comprising:
obtaining a plurality of first training samples and a label of each first training text of a plurality of training texts, wherein the label of the first training text is used to indicate named entity information corresponding to the first training sample.

7. The method according to claim 6, wherein loss functions used when the first machine learning model is trained comprise a first loss function and a second loss function; and
the first loss function is a loss function related to predicting the named entity information of the plurality of first training samples, and the second loss function is a loss function related to predicting the masked information.

8. The method according to claim 3, wherein the layout feature information that is in the image and that is of the content comprised in the image is obtained based on a second machine learning model, and a neural network corresponding to the second machine learning model comprises at least one of a convolutional subnetwork, a dilated convolutional subnetwork, or a deformable convolutional subnetwork.

9. The method according to claim 3, wherein the location feature information of the to-be-recognized text in the image is obtained based on a third machine learning model, and wherein a neural network corresponding to the third machine learning model comprises a convolutional subnetwork.

10. The method according to claim 9, wherein the neural network corresponding to the third machine learning model further comprises a spatial pyramid pooling subnetwork.

11. An electronic device, comprising:
at least one processor; and
a memory communicatively connected to the at least one processor, wherein
the memory stores instructions, which when executed by the at least one processor, cause the electronic device to:
obtain a plurality of recognition results of a to-be-recognized text in an image according to a plurality of recognition methods;
train a first machine learning model based on a plurality of first training samples, labels of the plurality of first training samples, a plurality of second training samples obtained after partial information of each of the plurality of first training samples is masked, and masked information;
based on a plurality of machine learning models including the first machine learning model, obtain semantic information of the plurality of recognition results;
obtain feature information of the image; and
determine a target recognition result from the plurality of recognition results based on the feature information and the semantic information, wherein the feature information of the image represents information around the to-be-recognized text in the image, and wherein the plurality of machine learning models comprise at least one machine learning model.

12. The electronic device according to claim 11, wherein the plurality of machine learning models comprise a first machine learning model; and
  wherein the stored instructions, when executed by the processor, further cause the electronic device to:
  obtain the semantic information of a recognition result of the plurality of recognition results based on the first machine learning model, wherein the semantic information of the recognition result comprises named entity information in the recognition result and semantic association information between words comprised in the recognition result.

13. The electronic device according to claim 11, wherein the plurality of machine learning models comprise a second machine learning model and a third machine learning model; and
  wherein the stored instructions, when executed by the processor, further cause the electronic device to:
  obtain, based on the second machine learning model, layout feature information that is in the image and that is of content comprised in the image;
  obtain location feature information of the to-be-recognized text in the image based on the third machine learning model; and
  obtain the feature information of the image based on the layout feature information and the location feature information of the to-be-recognized text in the image.

14. The electronic device according to claim 13, wherein the stored instructions, when executed by the processor, further cause the electronic device to:
  fuse the layout feature information and the location feature information of the to-be-recognized text in the image to obtain preliminary feature information of the image;
  perform pooling processing on the preliminary feature information of the image to obtain preselected feature information of the image; and
  combine the preselected feature information of the image and the location feature information of the to-be-recognized text in the image to obtain the feature information of the image.

15. The electronic device according to claim 11, wherein the plurality of machine learning models further comprise an attention mechanism-based neural network model; and
  wherein the stored instructions, when executed by the processor, further cause the electronic device to:
  use the feature information of the image and the semantic information of the plurality of recognition results as an input of the attention mechanism-based neural network model, and output a target label by using an attention mechanism-based neural network algorithm, wherein the target label indicates a probability that each recognition result of the plurality of recognition results is the target recognition result; and
  determine the target recognition result of the to-be-recognized text from the plurality of recognition results based on a similarity between the target label and each preset label, wherein each preset label corresponds to a recognition result obtained by using a recognition method of the plurality of recognition methods.

16. The electronic device according to claim 12, wherein the at least one machine learning model comprises the first machine learning model; and
  wherein the stored instructions, when executed by the processor, further cause the electronic device to:
  before first device sends the first machine learning model to second device, obtain a plurality of first training samples and a label of each first training text of a plurality of training texts, wherein the label of the first training text is used to indicate named entity information corresponding to the first training sample.

17. The electronic device according to claim 16, wherein loss functions used when the first device trains the first machine learning model comprise a first loss function and a second loss function; and
  wherein the first loss function is a loss function related to predicting the named entity information of the plurality of first training samples, and wherein the second loss function is a loss function related to predicting the masked information.

18. The electronic device according to claim 12, wherein the at least one machine learning model does not comprise the first machine learning model; and
  wherein the stored instructions, when executed by the processor, further cause the electronic device to:
  before the second device obtains the semantic information of the plurality of recognition results, obtain a plurality of first training samples and a label of each first training text of a plurality of training texts, wherein the label of the first training text is used to indicate named entity information corresponding to the first training sample; and
  train the first machine learning model based on the plurality of first training samples, labels of the plurality of first training samples, a plurality of second training samples obtained after partial information of each of the plurality of first training samples is masked, and masked information.

19. The electronic device according to claim 13, wherein a neural network corresponding to the second machine learning model comprises at least one of a convolutional subnetwork, a dilated convolutional subnetwork, or a deformable convolutional subnetwork.

20. The electronic device according to claim 13, wherein a neural network corresponding to the third machine learning model comprises a convolutional subnetwork.

* * * * *